Dec. 29, 1970  W. J. GERRY  3,550,324
SURFACE TREATING APPARATUS
Filed April 17, 1968  4 Sheets-Sheet 4

INVENTOR
William J. Gerry
BY John B. Clementson
ATTORNEY

United States Patent Office 3,550,324
Patented Dec. 29, 1970

3,550,324
SURFACE TREATING APPARATUS
William J. Gerry, Mendham, N.J., assignor, by mesne assignments, to Red Arrow Enterprises, Incorporated, Bryn Mawr, Pa., a corporation of Pennsylvania
Filed Apr. 17, 1968, Ser. No. 721,986
Int. Cl. B24b 7/00, 23/02
U.S. Cl. 51—109
20 Claims

ABSTRACT OF THE DISCLOSURE

In disclosing improvements in surface-treating machines of rotary single head type, a carrier and transmission are indicated, the carrier being mounted to be driven rotationally on a first axis which is coaxial with an angularly fixed member of the transmission. The single head of the machine is journaled on the carrier and is connected with the transmission for being angularly moved by the latter, the movement being in one direction of rotation on a second axis which is parallel to the first axis, while the transmission responds to angular movement of the carrier and the head moving together in an opposite direction of rotation about the first axis. Supplemental features disclosed are pertinent to structure for compensating for radial and moment effects of centrifugal force of the rotary head.

---

This invention relates to machines which rotationally operate a head structure against a work surface for the had structure to mechanically treat the surface of the work, and the invention is more especially concerned with improvements in surface-treating machines of the rotary single head type.

Among surface-treating machines heretofore known are those in which the head structure for actively contacting the work surface belongs either in the class which includes a rotary single head mounted to have an axis substantially perpendicular to the work surface during normal operation, or in the class which includes a plurality of rotary heads each head being on a corresponding axis substantially perpendicular to the work surface during normal operation. Each head referred to, whether in the single head or plural head machine, may for example comprise a brush or a pad suited for contacting the work surface and exercising in movement any one or more such functions as scrubbing, cleaning, waxing, buffing, polishing, or abrading the surface of the work. A plural head structure, considering the need for plural drive connections in the machine and the fact that there are gaps between the several heads, tends to offer smaller active head area in total for the actual amount of space required by comparison with a single head structure in a machine. Sets of heads are of course required for machines having plural head structure thereby adding to cost in general and to the amount of time needed for replacing the sets.

The present invention in relating more particularly to improvements in rotary single head type machines nevertheless departs from the usual expedient of having the machine rotate the single head about but one axis, and in fact introduces worthwhile features associated with the mechanical aspect that each point on the active surface of the head is controlled to prescribe a path varying in distance from a first axis about which the head is cranked while being rotated with reference to a second axis, the latter being the axis of the head itself and being parallel to the first axis. Toward controlling this variance in distance of each point on the active surface of the head to be according to a given pattern, a transmission arrangement is present which is responsive to rotation of the head and carrier structure about the first axis thereby to cause the head to rotate on the second axis in a direction counter to that in which the head is bodily moving about the first axis. In this operation, each point on the active surface of the head varies in distance with reference to the first axis and the head accordingly exercies a relatively complex surface treating action.

The foregoing characteristics in accordance with the present invention furthermore are had through the provision of structure enabling the distance between the first and second axes to be small thus diminishing the magnitude of the variation in distance of each point on the active face of the head from the first axis during rotation of the head on the second axis and also diminishing eccentricity of the head with reference to the first axis and offering favorable opportunity for the radial and moment effects of centrifugal force of the head to be satisfactorily compensated. In preferred embodiments of the present invention the surface-treating machine is indeed arranged compensated for radial and moment effects of centrifugal force, one such embodiment and modifications thereof being represented in the accompanying drawing in which:

Figure 1:
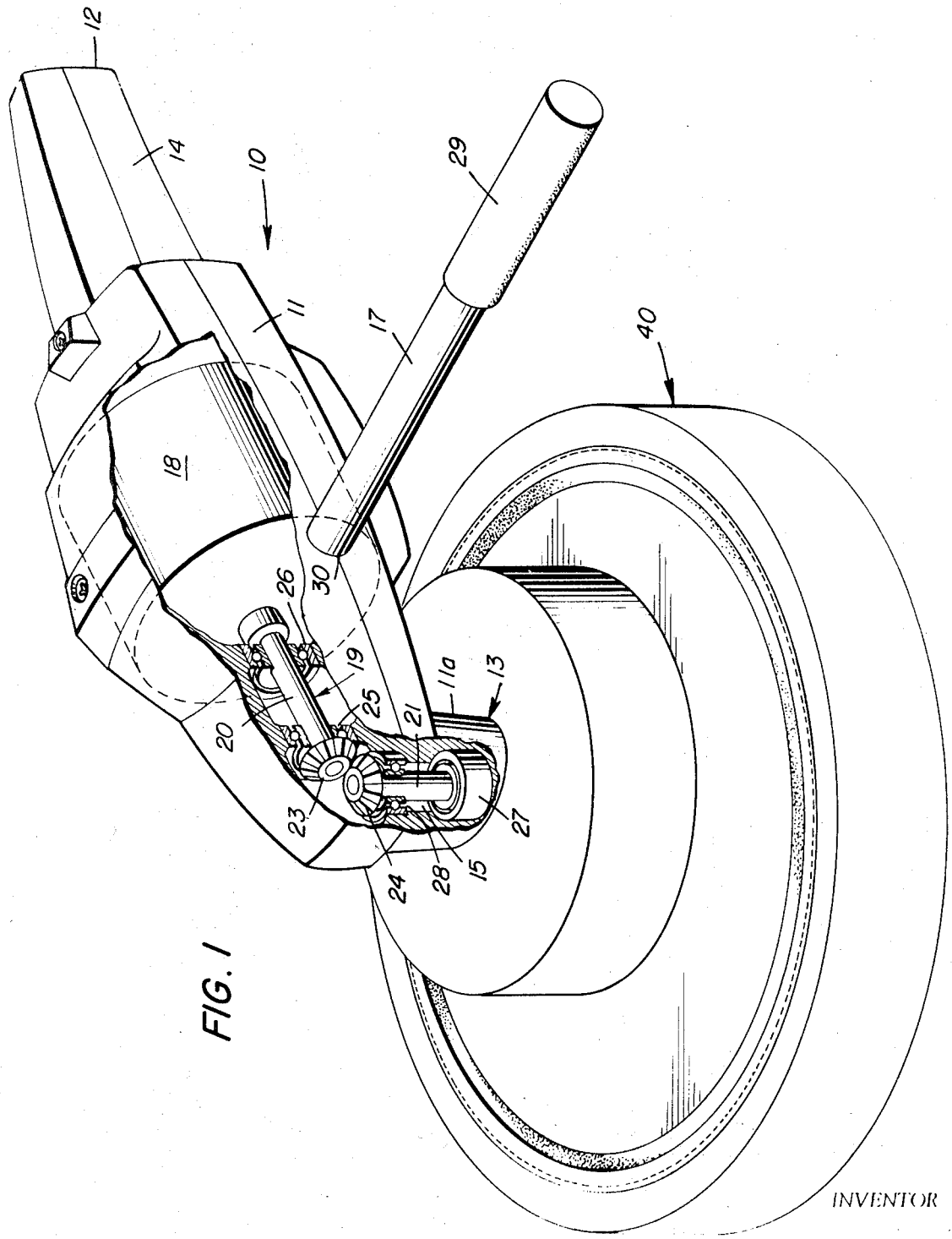
FIG. 1 is a perspective view, partially broken away, of a surface-treating machine of rotary single head type constructed in accordance with the present invention.
Figure 2:
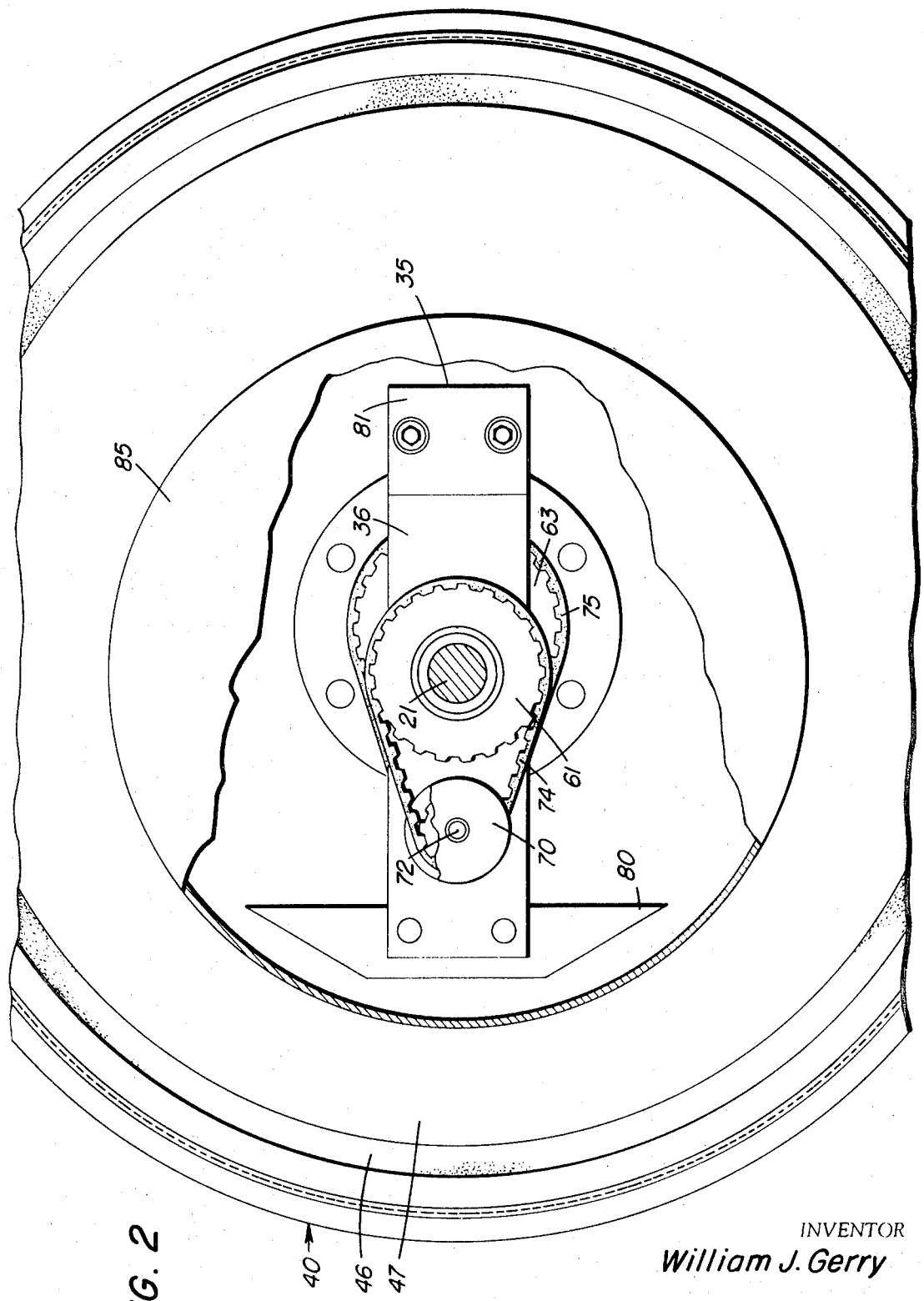
FIG. 2 is a top plan view corresponding to FIG. 1, and is partially broken away to reveal details.
Figure 4:
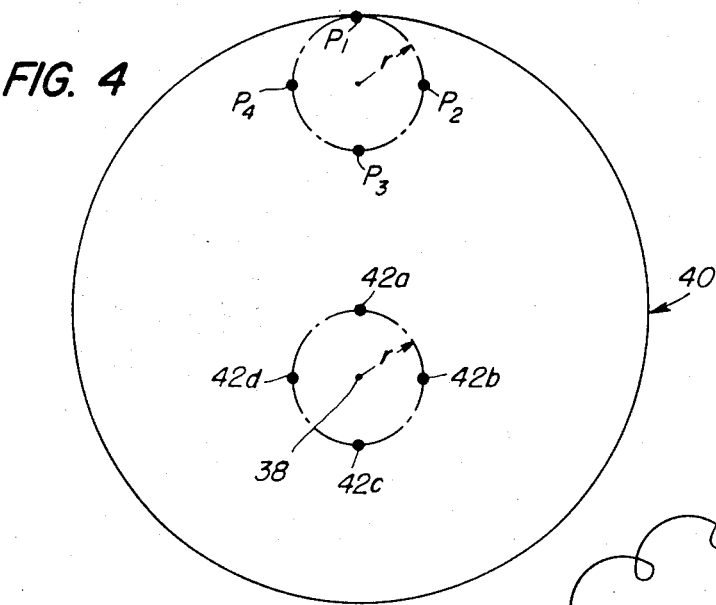
Figure 5:
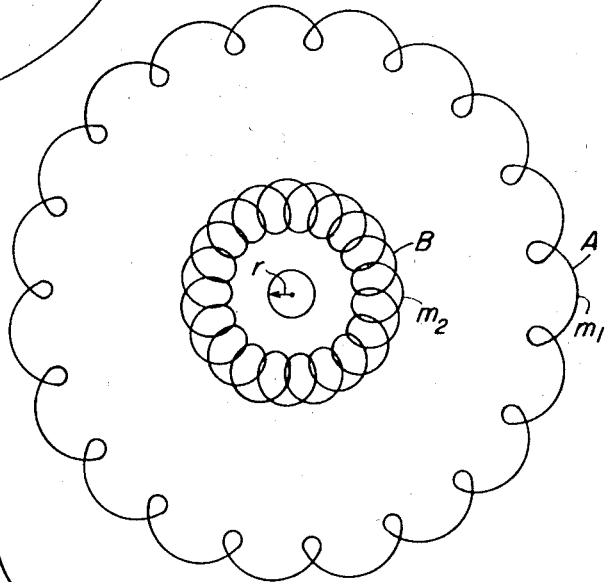
Figure 6:
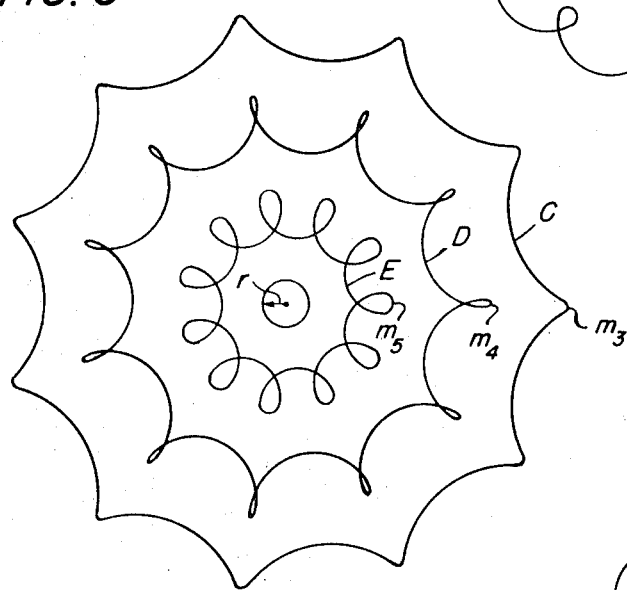

FIG. 4 is a diagram representing movement of a given point on the active face of the head through a cycle per revolution of the head and the carrier means; and FIGS. 5 and 6 are diagrams each relating to a machine similar to that of FIG. 1 except for having a different transmission ratio, and the diagram represents orbital and cyclic movement of a given point on the active face of the head in accordance with the corresponding transmission ratio.

Referring now more particularly to FIG. 1 of the drawing a power-operated surface-treating machine designated by the reference numeral 10, is provided in accordance with the present invention and is characterized by comprising a main handle 14 which in this particular embodiment longitudinally extends rearwardly in the machine is formed by an outer one end portion or leg 12 of the housing 11 for the machine to be manually wielded by an operator. The opposite end portion or leg 13 of the housing projects interconnected by an elbow 11a of the housing with the end portion 12 and has an end aperture 15 therein leading into the interior of the housing. A motor 18 within the housing end portion 12 is of any suitable rating and kind, for example electric or fluid, and is suitably based securely with reference to the housing having angular power-output or drive shaft means 19 within the housing.

Bevel gears 23 and 24 situated within the elbow 11a of housing 11 are in mesh and respectively are connected with the adjacent ends of components 20 and 21 of the drive shaft means 19 to rotate with these components. Component 20 is within the housing end portion 12 and is journaled at 25 and 26 and connected in driven coaxial relation to the rotor (not shown) of motor 18, while component 21 is within the housing end portion 13 and is journaled at 27 and 28, having an outer end extending through the housing aperture 15 and projecting exteriorly of the aperture. A supplemental handle 17 of rigid rod form longitudinal leads laterally of the shaft component 20 and main handle 14, in an outward direction from the region of elbow 11a of the housing, and is provided with a hand grip 29 for the machine 10 to be welded by an operator having this grip and the main handle 14 in his respective hands. The inner end of the supplemental handle 17 is separably connected at 30 with the housing 11 in the region of elbow 11a and thus may be installed on the machine or be omitted for operational use of the machine either with or without the supplmental handle.

Figure 3:
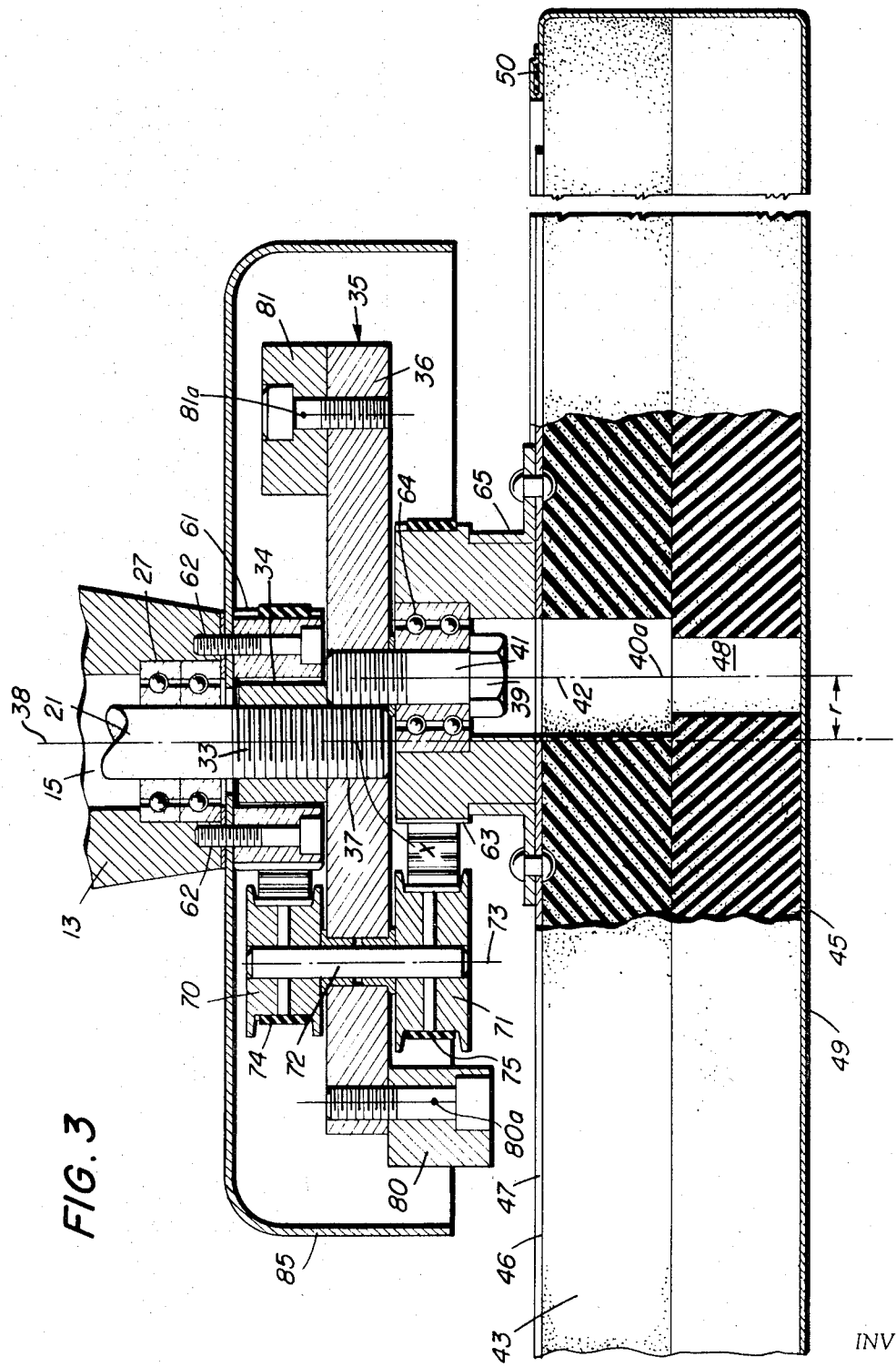
FIG. 3 is an elevational sectional view corresponding to FIG. 1 and is broken away omitting the motor and handle end of the machine.

As will be seen in FIG. 3, the outer end of the shaft component 21 is threaded at 33 outside the aperture 15 and the thread is engaged with a spacer nut 34. The same shaft component supports carrier means 35 which includes a generally rectangular bar 36, the latter, within a bore 37 thereof having a thread in engagement with the shaft end thread, and the bar being tightened into a stopped interrelation against the spacer nut 34 to rotate with the shaft component 21. The bore 37 is located substantially at the center of symmetry of the bar 36 and is directed for the bar bodily to lie substantially perpendicular to the axis of the shaft component 21. Thus the carrier means 35 is mounted to be driven rotationally on power supplied to the shaft component 21, the rotation being about a first axis 38 which is the axis of this same shaft component.

A single head 40 of the machine 10 is connected with the carrier means 35 through a stab shaft 41 for being carried about the first axis 38 and meanwhile to be angularly moved on a second axis 42 which is parallel to the first axis 38. Notably in this interrelation the axis 38 is directed through the head 40. Axis 42 is that of the stub shaft 41 and advantageously is spaced but a short radial distance $r$ from the axis 38. Head 40 as shown is generally circular in cross section, having a substantially cylindrical core 43 made of a resilient material, such as any suitable synthetic resin sponge or foam which is resilient. In the relaxed condition of the core the opposite end faces 45 and 46 may be substantially parallel. On side 46 the core supports an annular reinforcing plate 47, such as of metal, bonded or otherwise affixed thereto and having an outer peripheral edge which is marginally insider the perimeter of the core. Centrally axially, the core 43 has an opening 48 aligned with a corresponding opening in the annular reinforcing plate. A shroud 49, made of a soft material such as terry cloth, covers end face 45 as well as the peripheral side of the core 43 and overlaps the end face 46. Within a lapped edge of the shroud, located adjacent to the end face 46, there is a draw string 50 pulled taut and secured for the shroud to be in conformity with the core and rotate unitarily with the core while that portion of the shroud which is directly outside the core face 45 is bearing upon a work surface. Another head, such as to satisfy one or more such functions as scrubbing, waxing, polishing, buffing, abrading, or the like, may of course be used in the machine 10 instead of the particular head just described.

Notably, the component 21 of drive shaft means 19 is coaxial with a first drive member 61 which is immovably fixed by machine screws 62 to the end of portion 13 of the housing wherein the aperture 15 is formed, and a second drive member 63 is coaxial with the stub shaft 41 and is journaled to this stub shaft by means of an anti-friction bearing 64. For this surpose, the stub shaft 41 is included as a portion of a machine screw 39 which is threadedly engaged with the bar 36 for mounting the second drive member and its bearing 64 on the bar. A fixed collar 65, angularly flanged, has one of its flanges immobily fixed to the second drive member 63 and the other of its flanges immobily fixed to the reinforcing plate 47 of the head 40. In this manner the second drive member 63 and the head 40 are arranged to rotate unitarily coaxially on the aforementioned second axis 42. Further, it will be noted that the first and second drive members 61 and 63 are on opposite sides of the carrier means 35, the first drive member 61 being disposed adjacent to a first side of the bar 36 and the second drive member 63 being disposed adjacent to a second side of the bar which is opposite the first side.

A third drive member 70 and a fourth drive member 71 have in common an interconnecting shaft 72 and are in an angularly fixed interrelation having the latter shaft journaled on bar 36 of the carrier means for the third and fourth drive members and their interconnecting shaft to be rotated in unison coaxially on a third axis 73 which is parallel to the axes 38 and 42. It will also be seen that the third drive member 70 is located on the same side of the carrier bar 36 as the first drive member 61 and is laterally opposite the first drive member, and that the fourth drive member 71 is situated on the opposite hereinbefore mentioned second side of the carrier bar along with the second drive member 63 and the head 40 and is laterally opposite the second drive member. Axis 73 is located for the third and fourth drive members 70 and 71 to generate on rotation with the carrier bar 36 about the axis 38 a greater orbit with reference to the latter axis than the second drive member 63 generates also with reference to this same aixs 38.

The aforementioned first and second drive members 61 and 63, and the third and fourth drive members 70 and 71 as represented in the present embodiment all are gears, and these gears along with the interconnecting shaft all are components of transmission means for the head 40 to be driven rotationally on the axis 42. The transmission means further includes a first flexible endless gear belt 74 extending around the first and third drive members 61 and 70 and in mesh with teeth of these gears, and a second flexible endless gear belt 75 extending around the second and fourth drive members 63 and 71 and in mesh with teeth of these gears, for the transmission means in response to angular movement of the bar 36 on axis 38 to rotate the head 40 on the axis 42 in a direction of rotation opposing the direction of rotation of the bar 36 on the axis 38. The rotation of the bar 36 on axis 38 of course is introduced by operation of the motor 18 and by the drive accordingly effected by the motor operation of shaft means 19. In the present embodiment the gear ratio of the transmission means is arranged having a 1:1 ratio, for each revolution of the bar 36 on the axis 38 to be accompanied by an oppositely angularly directed revolution of the head 40 on the axis 42.

Assuming that all points on the shroud 49 are fixed in position on the head 40 and that the machine 10 is operating while the housing 11 and axis 38 are fixed in space, all of these points when brought into contact with a fixed work surface, will each trace out a path of surface-treating movement along which the distance of the point from the axis 38 varies by as much as twice the distance $r$ between the axes 38 and 42. Accordingly, FIG. 4 diagrams positions $p_1$, $p_2$, $p_3$ and $p_4$ for a typical one of these points and the positions in the order named respectively correspond to positions 42a, 42b, 42c and 42d of the axis 42 as the latter revolves about the axis 38. A cycle of the point begins at $p_1$ and progresses to $p_2$, $p_3$ and $p_4$ and back to the end at $p_1$ while the head 40 moves through one revolution on the axis 42 in a rotational direction which is counter to the direction in which the axis 42 orbits axis 38. The latter orbit starts with position 42a and thence extends progressively through positions 42b, 42c and 42d and back to position 42a. It will be appreciated that the cyclic circular path of the point has a radius equal to the distance $r$ between the axes 38 and 42.

The carrier means 35 further includes projecting on the opposite ends of the bar 36 a pair of weighting portions 80 and 81 which are attached to these ends by machine screws. Of course, if desired, the bar and end portions may be made as a single element. Notably, the portions 80 and 81 introduce local centers of gravity 80a and 81a at the opposite ends of the carrier means and these centers of gravity are in different planes normal to the axis 38, are substantially in a plane of the axis 38, and are in substantially opposite radial directions from this axis, so that the centrifugal forces produced from these centers of gravity not only oppose each other as radial forces but introduce moment effects which act clockwise about a point $x$ on the axis 38 as viewed in FIG. 3. The moment effects just mentioned are counter to a moment effect produced about the same point x on the axis 38 by centrifugal force of the head 40. By way of further explanation, the center of gravity 40a of the head is substantially on the axis 42, and the moment effect of centrifugal force of the head acts counterclockwise about the point x on the axis 38 as viewed in FIG. 3. There is the additional aspect that the weighting portion 80 is heavier than the weighting portion 81, and that the radial effect of centrifugal force of the weighting portion 80 acts against the radial effects of centrifugal force of the head 40 and the weighting portion 81. The weighting portions 80 and 81 and their differential may also be in adjustment to compensate for other moment and radial effects produced by centrifugal force such as those related to the centers of gravity of certain members of the transmission gearing.

Machine 10 is further characterized by having a safety hood 85 which is an extension of the housing 11, and more particularly the hood is an attachment secured to the housing end portion 13 by the machine screws 62 and is centrally open to receive the drive shaft component 21. Hood 85 covers the hereinbefore described carrier means, transmission means and a facial area of the rotary head 40 with tolerance for the head 40 to move about the axis 38 and on the axis 42.

It will be understood that more generally the transmission means in surface-treating machines in accordance with the present invention is arranged for driving the head in response to movement of the carrier means in one direction of rotation for the head to move in an opposite direction of rotation, and that the transmission means may have any one of a number of possible ratios for the latter purpose. Nevertheless, it is found that there are particular ratios which are especially beneficial where the transmission means is arranged to operate the head in accordance with any one of these and thus for the head to effect an angular movement in the approximate range of 0.75 revolution to 1.25 revolution, in the direction of rotation thereof which is opposite to the direction of rotation of the carrier means, per revolution of the carrier means. This ratio range therefore includes the 1:1 ratio hereinbefore described with reference to FIG. 4, and as well includes ratios whereby the extent of angular movement of the head differs from the extent of angular movement of the carrier means, with the difference being not more than approximately 0.25 revolution per revolution of the carrier means. By having the ratio of the transmission means in one of the present surface-treating machines other than 1:1 and the transmission means of the machine arranged to drive the head in one direction of rotation on the axis of the head by an amount which differs by no more than about 0.25 revolution per revolution of the carrier means in the opposite direction of rotation, each point on the work-treating face of the head is thus moved through beneficially substantially frequent cycles per complete orbit of the point about the axis of rotation of the carrier means as the carrier means and head revolve. This cyclic movement suggests being epicyclic where the angular movement of the head is less than one revolution per revolution of the carrier means and suggests being hypocyclic where the angular movement of the head exceeds one revolution per revolution of the carrier means. Referring to typical examples of transmission ratios within the category of the head angular movement differing by no more than 0.25 revolution from the angular movement of the carrier means per revolution of the carrier means, FIG. 5 applies to one of the present machines having the transmission means appropriately arranged so that the head is moving 0.95 revolution per revolution of the carrier means, the directions of rotation being opposite and r being one-half inch. Curves A and B represent paths which respective points on the work-treating face of the head follow orbitally around the rotational axis of the carrier means, the point following path A being six inches out radially from the axis of rotation of the head, and the point following path B being two inches out radially from the axis of rotation of the head. By observing positions $m_1$ and $m_2$ designating initial positions in the orbits of these points it will be realized that the point in the corresponding orbit effects nineteen cycles of movement from the initial position $m_1$ or $m_2$ back to the initial position, and thus for each complete orbit, with accompanying crank action on the radius r. Meanwhile, for each of the points to trace out a corresponding complete orbit from the initial position, the carrier means effects twenty revolutions on the rotational axis thereof. FIG. 6 applies to one of the present machines having the transmission means appropriately arranged so that the head is moving 1:1 revolution per revolution of the carrier means, the directions of rotation being opposite and r being one-half inch. Curves C, D and E are representative of orbital paths about the rotational axis of the carrier means each for a point on the work-treating face of the head, point C being six inches radially from the rotational axis of the head while comparably point D is four inches and point E is two inches radially out from the latter axis. Positions $m_3$, $m_4$ and $m_5$ are the initial positions of the points C, D and E in their respective orbits and it will be seen that each point per orbit undergoes eleven cycles of movement with accompanying crank action on the radius r. This is while the carrier means completes ten revolutions on the rotational axis of the carrier means. Thus it will be appreciated that by utilizing ratios of the transmission means whereby the points on the work-treating face of the head undergo substantially frequent cycles during each complete orbit made by the point about the axis of the carrier means a highly satisfactory work-treating mechanical action by the head is had when the treating face and the pattern of movement thereof are applied to the work surface. The influence of the crank action on the radius r is sharply imparted to each point on the work-treating face of the head. Moreover, the advance of the point angularly about the rotational axis of the carrier means per cycle of movement of the point is far less than a full orbital advance of the point and thus alleviates such difficulties as burning or scorching the work by the head during the surface-treating action of the machine.

While machines constructed in accordance with the present invention may have the distance between the rotational axes of the carrier means and the head be any one of a variety of possible magnitudes, it is usually most practical to have this distance hereinbefore referred to as r be in the approximate range of 0.2 inch to 2.0 inches to sustain appreciable change in the radial position of each point on the work-treating face of the head with reference to the axis of rotation of the carrier means per cycle of movement of the point. It is also considered that the head used in the machine is usually most practically of a diameter of anywhere from about 6 inches to 20 inches across the work-treating face which itself may extend to approximately the rim of the head.

As many possible embodiments of the invention may be made and as many possible changes may be made in the embodiments hereinbefore set forth, it will be distinctly understood that all matter described herein is to be interpreted as illustrative and not as a limitation.

I claim:

1. In a surface-treating machine of rotary single head type, the combination which includes, carrier means mounted to be driven rotationally about a first axis, and transmission means, said transmission means including, a non-rotatably fixed first drive member coaxial with said first axis, a second drive member, said second drive member and the single head of the machine being in non-rotatably fixed interrelation and journaled on said carrier means for being rotated in unison with each other coaxially on a second axis parallel to said first axis and for being carried about said first axis by said carrier means with said first axis directed through said head, and interconnecting means disposed journaled on said carrier means about a third axis parallel to said first and second axes in order to generate a greater orbit with reference to said first axis than said second drive member generates with reference to said first axis on rotation of said carrier means on said first axis, and said interconnecting means being engaged with said first and second drive members for said transmission means to respond to angular movement of said carrier means on said first axis and angularly move said second drive member and thus said head on said second axis in a direction of rotation opposing the direction of rotation of said carrier means on said first axis.

2. In a surface-treating machine of rotary single head type, the combination as set forth in claim 1 and characterized by the ratio of said transmission means being arranged for said head to effect an angular movement in the approximate range of 0.75 revolution to 1.25 revolutions in said direction of rotation thereof on said second axis, per revolution of said carrier means in said opposite direction of rotation thereof on said first axis.

3. In a surface-treating machine of rotary single head type, the combination as set forth in claim 1 and characterized by said transmission means being arranged for each revolution of said carrier means on said first axis and each revolution of said head on said second axis to be in 1:1 ratio.

4. In a surface-treating machine of rotary single head type, the combination as set forth in claim 1 and characterized by the ratio of said transmission means being arranged for the extent of angular movement of said head in said direction of rotation thereof on said second axis and the extent of angular movement of said carrier means in said opposite direction of rotation thereof on said first axis to differ and have the difference be not more than approximately 0.25 revolution per revolution of said carrier means in said direction of rotation thereof on said first axis.

5. In a surface-treating machine of rotary single head type, the combination as set forth in claim 1, wherein said head and first and second weighting portions of said carrier means have their centers of gravity each in a direction and at a radial distance from said first axis and in a different plane normal to said first axis, for the radial and moment effects of centrifugal forces of said first and second weighting portions of said carrier means to compensate for radial and moment effects of centrifugal force including the radial and moment effects of centrifugal force of said head.

6. In a surface-treating machine of rotary single head type, the combination of claim 5, wherein each of said first and second weighting portions of said carrier means includes a projection, and said projections extend outward in generally opposite directions for said weighting portions of said carrier means thus each to have said center of gravity thereof in a different plane normal to said first axis.

7. In a surface-treating machine of rotary single head type, the combination of claim 5, wherein said first drive member extends radially intermediately of said first axis and said first portion of said carrier means and said second drive member extends radially intemediately of said second axis and said second portion of said carrier means, and each of said weighting portions of said carrier means includes a projection, said projections extending outward in generally opposite directions for said portions of said carrier means thus each to have said center of gravity thereof in a different plane normal to said first axis.

8. In a surface-treating machine of rotary single head type, the combination as set forth in claim 5, wherein said head and first and second weighting portions of said carrier means have their centers of gravity approximately in a plane in common with said first axis, said center of gravity of said head being substantially on said second axis, and said centers of gravity of said first and second weighting portions of said carrier means being in substantially opposite radial directions from said first axis.

9. In a surface-treating machine of rotary single head type, the combination which includes, carrier means mounted to be driven rotationally about a first axis, and transmission means, said transmission means including, a non-rotatably fixed first drive member coaxial with said first axis, a second drive member, said second drive member and the single head of the machine being in non-rotatable fixed interrelation and journaled on said carrier means for being rotated in unison with each other coaxially on a second axis parallel to said first axis and for being carried about said first axis by said carrier means with said first axis directed through said head, and third and fourth drive members in non-rotatably fixed interrelation and journaled on said carrier means for being rotated coaxially in unison with each other on a third axis parallel to said first and second axes and to generate on rotation with said carrier means about said first axis a greater orbit with reference to said first axis than said second drive member generates with reference to said first axis, and said third drive member being disposed laterally opposite said first drive member and engaged therewith and said fourth drive member being disposed laterally opposite said second drive member and engaged therewith for said transmission means to respond to angular movement of said carrier means on said first axis to move said head angularly on said second axis in a direction of rotation opposing the direction of rotation of said carrier means on said first axis.

10. In a surface-treating machine of rotary single head type, the combination as set forth in claim 9, and characterized by said first and third drive members being disposed outwardly of a first side of said carrier means and by said second and fourth drive members being disposed outwardly of a second side of said carrier means opposite said first side, there being a first endless drive device extending around said first and third drive members and engaging said first and third drive members and there being a second endless drive device extending around said second and fourth drive members and engaging said second and fourth drive members for said transmission means in response to angular movement of said carrier means about said first axis to move said head angularly on said second axis in a direction of rotation opposing the direction of rotation of said carrier means on said first axis.

11. In a surface-treating machine of rotary single head type, the combination as set forth in claim 10, wherein said first and third drive members are gears having toothed interfit with portions of said first endless drive device and said second and fourth drive members are gears having toothed interfit with portions of said second endless drive device.

12. In a surface-treating machine of rotary single head type, the combination as set forth in claim 10, wherein said head and first and second weighting portions of said carrier means have their centers of gravity each in a direction and at a radial distance from said first axis and in a different plane normal to said first axis, for the radial and moment effects of centrifugal forces of said first and second weighting portions of said carrier means to compensate for radial and moment effects of centrifugal force including the radial and moment effects of centrifugal force of said head.

13. In a surface-treating machine of rotary single head type, the combination of claim 12, wherein said first axis is situated between said first and second weighting portions, said first weighting portion projecting outwardly on said first side of said carrier means and said second weighting portion projecting outwardly on said second side of said carrier means, said portion thus each having said center of gravity thereof in a different plane normal to said first axis.

14. In a surface-treating machine of rotary single head type, the combination of claim 13, wherein said first and third drive members are gears having toothed interfit with portions of said first endless drive device and said second and fourth drive members are gears having toothed interfit with said second endless drive device.

15. In a surface-treating machine of rotary single head type, the combination as set forth in claim 12 and characterized by the distance between said first and second axes being in the approximate range of 0.2 inch to 2.0 inches and by the ratio of said transmission means being arranged for said head to effect an angular movement in the approximate range of 0.75 revolution to 1.25 revolutions in said direction of rotation thereof on said second axis, per revolution of said carrier means in said opposite direction of rotation thereof on said first axis.

16. In a surface-treating machine of rotary single head type, the combination of claim 12 and characterized by the distance between said first and second axes being in the approximate range of 0.2 inch to 2.0 inches and by said transmission means being arranged for each revolution of said carrier means on said first axis and each revolution of said head on said second axis to be in 1:1 ratio.

17. In a surface-treating machine of rotary single head type, the combination as set forth in claim 12 and characterized by the distance between said first and second axes being in the approximate range of 0.2 inch to 2.0 inches and by the ratio of said transmission means being arranged for the extent of angular movement of said head in said direction of rotation thereof on said second axis and the extent of angular movement of said carrier means in said opposite direction of rotation thereof on said first axis to differ and have the difference be not more than approximately 0.25 revolution per revolution of said carrier means in said direction of rotation thereof on said first axis.

18. In a surface-treating machine of rotary single head type, the combination of claim 1 and characterized by further including; handle and housing means, comprising, a handle of the machine and a housing first leg, a housing second leg having an end aperture therein, and a housing elbow interconnecting said handle and housing first leg with said housing second leg; a motor securely inside said housing first leg, said motor having a rotor; drive shaft means including a journaled first shaft component and a journaled second shaft component respectively within said housing first leg and said housing second leg, said first shaft component being connected to rotate coaxially with said rotor, and said second shaft component leading rotatably on said first axis through said aperture in said housing second leg and being connected with said carrier means adjacent to said aperture for rotatably driving said carrier means; and gears within said housing elbow and secured meshing with one another rotatably with said first and second shaft components for said first shaft component driven by said rotor to drive said gears and said second shaft component.

19. In a surface-treating machine of rotary single head type, the combination of claim 18, wherein a safety hood connected with said housing second leg covers said carrier means, said transmission means and a facial area of said rotary head.

20. In a surface-treating machine of rotary single head type, the combination of claim 18, wherein said handle longitudinally leads rearwardly in the machine, and a supplemental handle connected adjacent to said elbow, longitudinally leads laterally of the machine.

References Cited

UNITED STATES PATENTS

| | | | |
|---|---|---|---|
| 1,069,803 | 8/1913 | Nelson | 51—120X |
| 2,303,531 | 12/1942 | Eyster | 51—120X |
| 2,437,152 | 3/1948 | Burleigh | 51—170 |
| 3,445,877 | 5/1969 | Stout | 15—98 |

ROBERT C. RIORDON, Primary Examiner

D. G. KELLY, Assistant Examiner

U.S. Cl. X.R.

15—49; 51—170